United States Patent [19]

Meermans

[11] Patent Number: 5,712,901
[45] Date of Patent: Jan. 27, 1998

[54] AUTOMATIC VOICE/TEXT TRANSLATION OF PHONE MAIL MESSAGES

[75] Inventor: David R. Meermans, Plano, Tex.

[73] Assignee: MCI Communications Corporation, Washington, D.C.

[21] Appl. No.: 670,906

[22] Filed: Jun. 26, 1996

[51] Int. Cl.$^6$ .................................................. H04M 1/64
[52] U.S. Cl. ............................. 379/88; 379/57; 379/90; 379/229
[58] Field of Search ................................ 379/67, 88, 89, 379/52, 100, 57, 93, 94, 90, 230, 229

[56] References Cited

U.S. PATENT DOCUMENTS

| | | | |
|---|---|---|---|
| 5,163,081 | 11/1992 | Wycherley et al. | 379/52 |
| 5,381,466 | 1/1995 | Shibayama et al. | 379/88 |
| 5,406,557 | 4/1995 | Baudoin | 379/94 |

OTHER PUBLICATIONS

Osman–Allu, N. A., "Telecommunication Interfaces for Deaf People," *IEE Colloquium on 'Special Needs and the Interface'*, IEE, London, 1993, pp. 8/1–8/4.

*Primary Examiner*—Fan Tsang

[57] ABSTRACT

A system for providing phone mail service for customers using either conventional voice telephones or text telephone units. The system of the present invention includes a phone mail unit for receiving a message from a caller, a switch connected to the phone mail unit for receiving the message and routing it to a translation unit for translation. The system also includes a gateway for receiving a data packet, containing call information related to the message. The data packet is routed to a console in the translation unit. A control interface is disposed between the gateway and the console. The control interface transfers the data packet from the gateway to the console. A communications assistant of the translation unit receives the message and data packet and translates the message from voice-to-text or text-to-voice. The translated message is then sent back to the customer's mailbox for storage and subsequent retrieval. The translated message may also be sent to the customer's electronic mailbox, pager and/or Internet address for retrieval.

15 Claims, 6 Drawing Sheets

AUTOMATIC VOICE/TEXT TRANSLATION OF PHONE MAIL MESSAGES

BACKGROUND OF THE INVENTION

1. Field of the Invention

The present invention relates to a system for processing phone mail messages. In particular, the present invention relates to a system for processing both voice and text phone mail messages and automatically converting voice messages to text and text messages to voice when needed.

2. Related Art

The telephone is used daily by several million persons having some degree of hearing loss. In most cases, a version of an ordinary voice telephone unit which has been amplified (over and above that provided by the network) using a telephone-mounted gain control and/or a hearing aid is used to communicate.

Text telephony is used by deaf people whose degree or type of hearing loss is such that they are unable to benefit from amplification of ordinary telephone signals. A typical text telephone unit comprises a microprocessor-controlled terminal consisting of a single line display scrolling left/right or right/left and displaying upper case characters only, an alphanumeric keyboard, and some means of enabling connection to the public switched telephone network (PSTN), either directly or by acoustic coupling.

This conventional text telephone unit is essentially a specialized form of a desk-top personal computer having a modem, running a communications software package. Memory is often provided for off-line preparation of material, downloading/conversion-capture, and retaining the last used communications settings. Direct connect units often have a dial-from-directory memory, a dial-from-keyboard capability, a remote retrieval of messages capability and auto-answer facilities. Variations on the above include multi-line displays (2-4 line LCD, CRT type), membrane type keyboards, built-in telephone handset, built-in printer, etc.

Text telephones are generally used in one of the following four ways: (1) to communicate directly person-to-person (sometimes called back-to-back), (2) to communicate via a relay service (mediated), (3) to access electronic mail (email) services and (4) to access information (database) services. Person-to-person use of a text telephone is directly analogous to the way in which many people use the ordinary telephone service, i.e., for a private conversation between two individuals.

To give greater access to the telephone network, beyond the small number of users having text telephones, relay services are used to connect a caller on a conventional voice telephone with another caller using a text telephone. Relay services employ an operator to translate voice messages from a hearing person using a conventional telephone into text messages for viewing by a deaf person using a suitable text telephone, and vice-versa. This service allows text telephone users to communicate with any user of an ordinary telephone, and vice-versa. However, if the available operators are busy, the caller must wait for an operator to become available in order to communicate with the caller on the other end.

Use of electronic mail and database services as an extension of text telephony accounts for a small portion of text telephone use. However, relay services now address many of the telecommunications needs of this user group. Database access is also an important area for text telephone use, as is the growing use of bulletin board services. More background on text telephony is provided in an article by N. A. Osman-Allu, entitled "Telecommunication Interface For Deaf People", based on a Conference Paper prepared for the IEE Colloquium on "Special Needs and the Interference," London, Digest No. 005, pp. 811-14, 1993, which is incorporated herein by reference.

Currently standard text telephony is less user friendly, and offers a more limited range of communication features than what has become the norm for voice telephony. For example, there is no straight-forward system currently available for a caller using a text telephone to leave a message for a caller using a voice telephone, or vice versa. Instead, callers must use a relay service for messaging. Also, equipment compatibility issues between standard text telephone users and standard hearing telephone users frequently cause problems, or make connections impossible. These problems have been partly solved either by intervention on a case by case basis, or by preplanned adaptations such as direct text-to-text connections, or text-to-hearing connections.

There is a growing demand to provide more services and to better integrate text telephony, for deaf and other users, into main stream telephone usage. Easily used, fully functional integrated phone mail is one of the standard services which needs to be available to deaf users.

Thus, what is needed is a system for providing reliable phone mail services to deaf users. In particular, what is needed is a phone mail system that can accept either text or voice messages and translate voice messages into text for deaf users to access at a later time so that the translation of the messages is transparent to the caller.

SUMMARY OF THE INVENTION

The present invention provides voice-to-text and text-to-voice services in conjunction with a phone mail service. The voice-to-text portion of this invention provides two key functions: (1) automatic conversion of voice phone mail messages into text phone mail and storage of these messages for subsequent retrieval by deaf users; and (2) automatic translation of voice phone mail messages to text with dispatch to text pagers, electronic mailboxes and Internet addresses. Similarly, the text-to-voice portion of this invention also provides the key function of automatic translation of text phone mail messages to voice and storage of these voice messages in the phone mail unit for subsequent retrieval.

To utilize this phone mall service, a customer is provided with two phone numbers: one for voice callers, and one for callers using text telephone units. The customer may then provide either of these numbers to callers, depending on if they have a conventional voice phone or a text telephone unit. Thus, callers can leave a message using a format (voice or text) which corresponds to their own telephone format. Further, the caller does not have to wait for an operator to become available to leave a message. Thus, the caller can dial into the system and leave a message, and the subsequent translation of that message is transparent to the caller.

For a customer desiring to retrieve their phone mall messages in text form, messages left using the voice phone number are automatically translated into text by a communications assistant and stored in the customer's text mail box. Messages left using the text phone number are sent directly to the customer's text mail box.

Similarly, for customers desiring to retrieve their phone mail messages as voice messages, messages left in text form are automatically translated into voice by a communications assistant and stored in the customer's voice mail box. Messages recorded as voice mail messages are sent directly to the customer's voice mail box. The customer may then retrieve all messages in the preselected format from their mail box.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

A preferred embodiment of the present invention is now described with reference to the figures where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Figure 1:
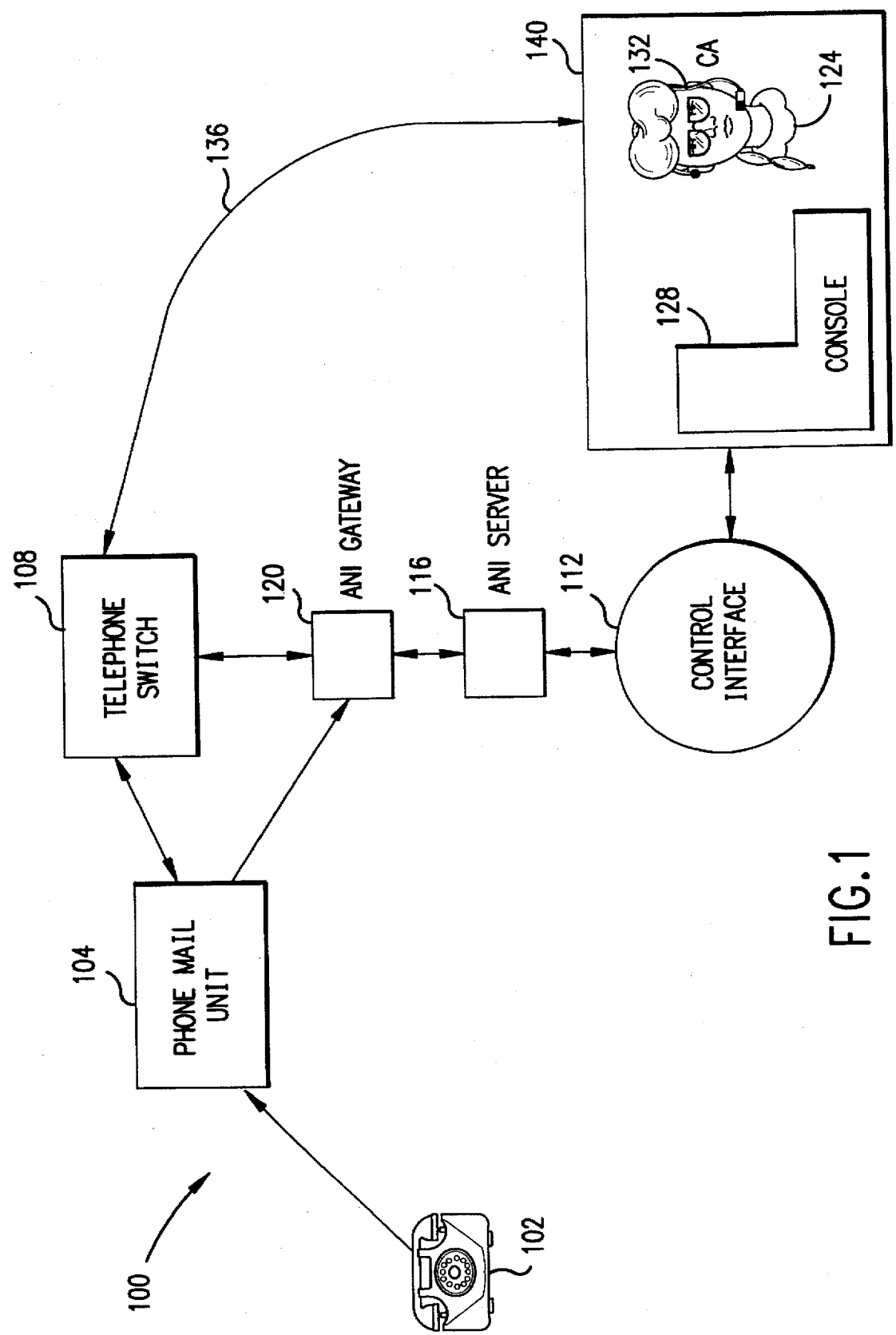
FIG. 1 shows a phone mail unit of the present invention.

FIG. 1 shows a system 100 of the present invention. A caller uses a telephone 102 to enter system 100. Telephone 102 can be either a conventional voice telephone or a text telephone unit, or any other device commonly used to send or receive voice or text information via phone lines. System 100 includes a phone mail unit 104, a telephone switch 108, and a control interface 112. Phone mail unit 104 includes a memory for storing customer account information and phone messages. In the preferred embodiment, the customer account information is accessed by the customer's phone numbers.

In the preferred embodiment, phone mail unit 104 is an IBM-compatible personal computer equipped with hardware capable of connecting to individual telephone or T1 lines and providing a means of receiving a call, playing a greeting, recording any response, and then dialing out and playing back the recorded response. The hardware of phone mail unit 104 manages the control of the telephone lines and recording and playback of the messages. The software operating on the PC controls the sequence of events and may be written in a number of computer languages specifically designed for phone mall system implementation, including but not limited to, VOS by Parity Software, San Francisco, Calif. The software may also be written using a general purpose computer programming language, such as C.

Phone mall unit 104 can be a conventional phone mall unit, such as Model D/41D, available from Dialogic, Parsippany, N.J. Phone mall unit 104 of the present invention also has the capability to receive and store text messages from text telephone units, in addition to receiving and storing voice message. It would be apparent to one skilled in the relevant art how to design a phone mall unit having such capability.

In one embodiment, telephone switch 108 is a Rockwell Galaxy Automatic Call Distributor (ACD). Further, in the preferred embodiment, control interface 112 is a Local Area Network (LAN). It should be apparent to one skilled in the relevant art that other network systems could also be used for control interface 112. Although the system of FIG. 1 shows only one control interface 112, this is for example only. An alternate system may have a plurality of control interfaces.

Control interface 112 has an associated ANI Server 116 and an ANI Gateway 120. In another embodiment, ANI Server 116 and ANI Gateway 120 are combined in a single gateway device (not shown) which provides the functionality of both elements. In another embodiment, the telephone switch may be able to interconnect with a console directly, so that the control interface may be eliminated entirely.

The Rockwell Galaxy ACD of the preferred embodiment has an X.25 transaction port through which certain information related to calls may be output for use by external systems. In the preferred embodiment, ANI Gateway 120 and ANI Server 116 are personal computers that run essentially protocol conversion software. ANI Gateway 120 distributes message data to ANI Server 116 based on the ACD line or station number to which the data applies. In the process, it also converts the X.25 messaging of the ACD to an internal form used by ANI Gateway 120 and ANI Server 116. ANI Server 116 receives the messages from ANI Gateway 120 and passes them to the correct communications assistant console (described in further detail below) based upon the line or station number stated within the message data. ANI Server 116 also converts the message format to an Ethernet message format for transmission to the communications assistant console.

The ANI Gateway/Server pair is installation specific, thus the configuration described herein is by way of example only. Other configurations of these elements to provide a connection between telephone switch 108 and the communications assistant console could be used.

ANI Gateway 120 and ANI Server 116 allow a single ACD (telephone switch 108) to serve multiple geographically dispersed call centers. As described above, ANI Gateway 120 receives a call data packet that comes with an incoming call and routes it to an ANI Server 116 situated in the call center where a communications assistant 124 is located. ANI Gateway 120 has a table that associates each communications assistant line number with their location, and hence the corresponding ANI Server 116. It is also possible for the ACD (telephone switch 108) to communicate with communications assistant 124 either directly via Ethernet, Token Ring, or other means, or by way of a Computer Telephony Integration (CTI) Interface connection.

Communications assistant (CA) or human operator 124, is connected to control interface 112 via a console 128. Console 128, includes a display device (not shown) and a keyboard (not shown). Thus, console 128 could be a general purpose computer, teletype machine or other text telephone unit. CA 124 is also connected to telephone switch 108 via a headset 132 and a conventional telephone line 136. In one embodiment, headset 132 includes speakers located near the CA's ears on either side of headset 132 for listening to voice messages, and a microphone located near the CA's mouth for speaking messages for recording. Console 128, communications assistant 124 and headset 132 are collectively referred to as a translation unit 140.

To set up an account, a customer orders text phone mall service. The service provider then issues two different phone mall access numbers to the customer. One access number is for callers using a conventional voice phone. The other access number is for callers using a text telephone unit.

The customer then provides a voice greeting for the voice mail access number and a text greeting for the text mail access number. After the customer has entered the greetings, the entries are stored in memory in phone mail unit 104. When a caller accesses the service via the voice mail phone number, the caller hears the customer's greeting via playback of the recorded voice or via a voice synthesizer. When a caller accesses the service via the text mail phone number, the caller receives the text greeting via his or her text telephone unit.

Figure 2A:
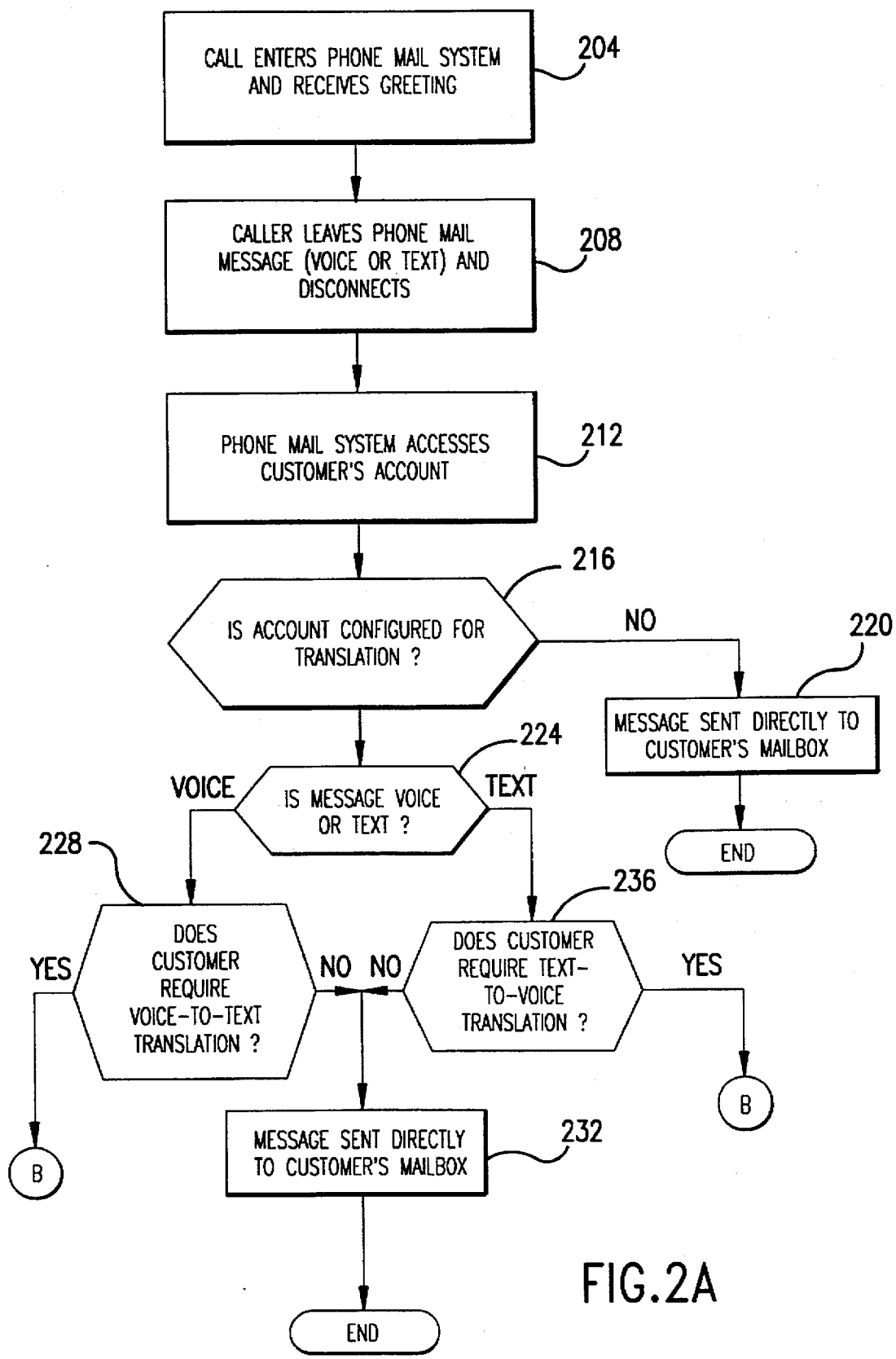
FIGS. 2A-2C show a call flow of the present invention.
Figure 2B:
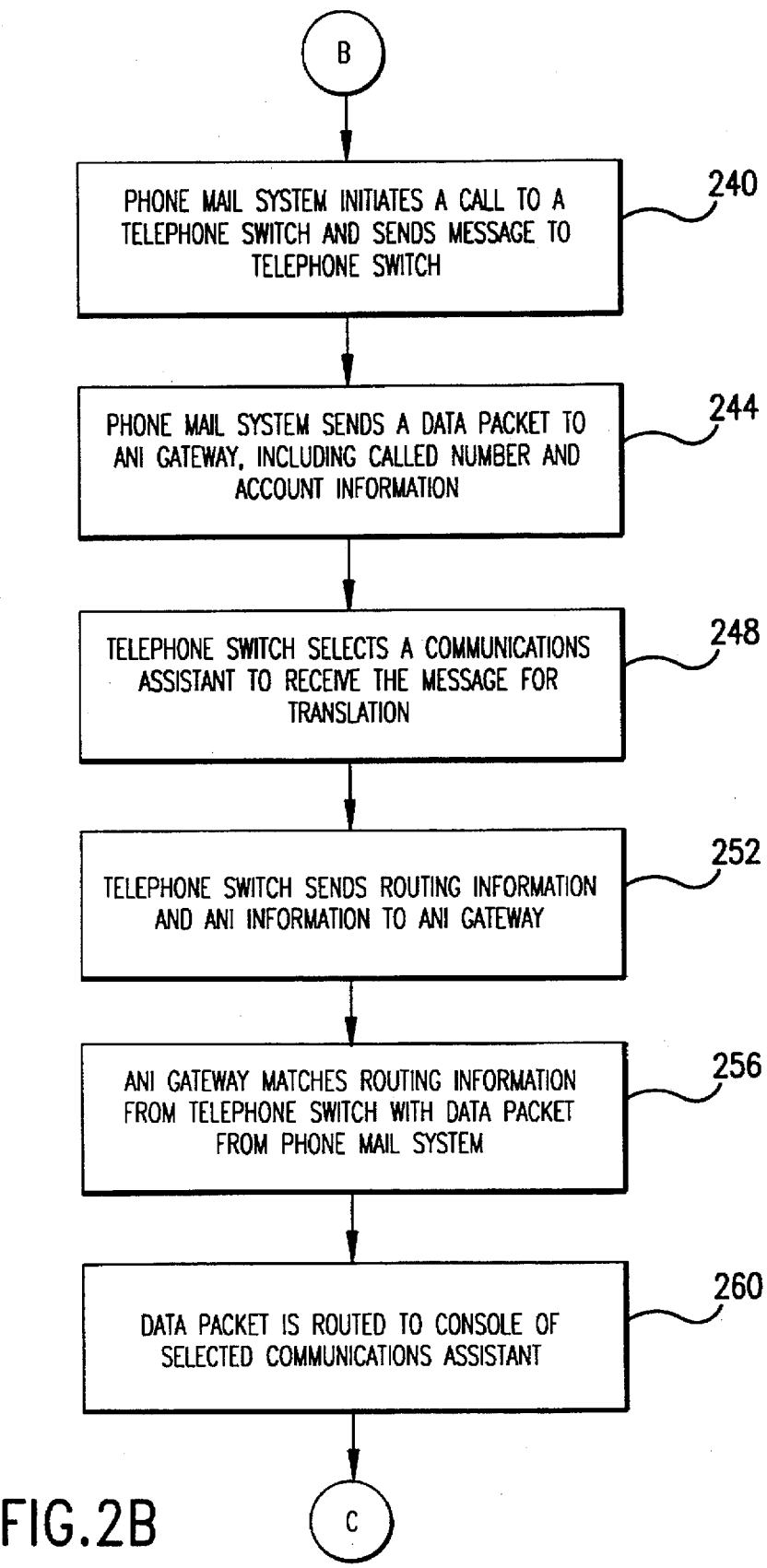
Figure 2C:
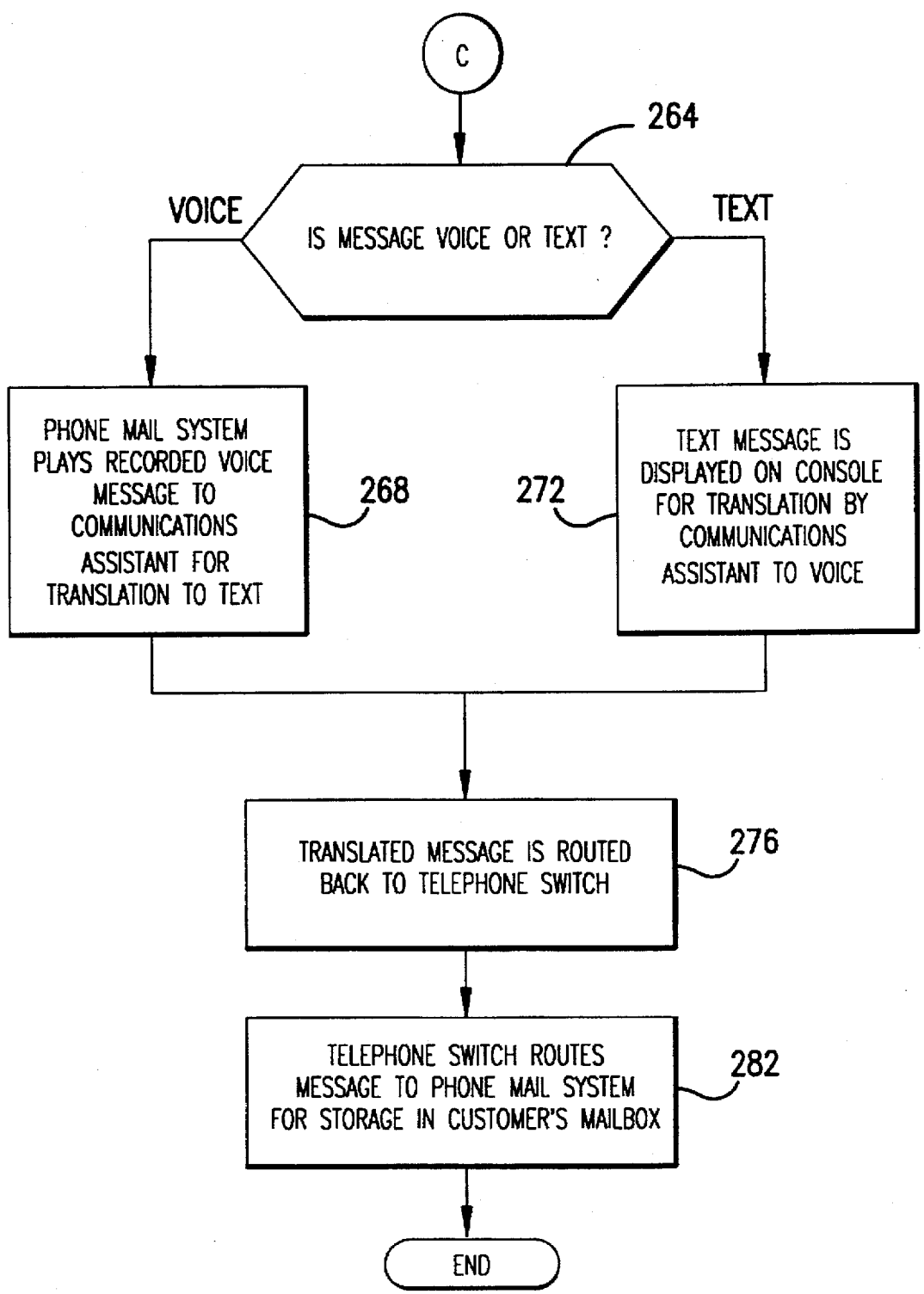

FIGS. 2A-2C show a call flow followed during a call to system 100. In a step 204, a call from a caller enters system 100 and the caller receives a greeting from phone mail unit 104. Phone mail unit 104 receives the called number via Direct Inward Dial (DID) signals provided by conventional central telephone office equipment. If a voice mailbox was called, phone mail unit 104 greets the caller with a voice message, and prompts the caller to record a message. In one embodiment, phone mail unit 104 uses a voice synthesizer to speak the greeting to the caller. If a text mailbox is called, the caller is prompted via a text telephone unit to leave a text message. In a step 208, the caller leaves a message and then disconnects.

Upon disconnect, phone mail unit 104 accesses information stored in the customer's account, as shown in a step 212. Phone mail unit 104 uses the customer information to determine if the account is configured for translation, namely, if the customer has ordered the translation service, as shown in a step 216. If so, phone mail unit 104 also determines if the customer desires translation from voice-to-text or text-to-voice. If the account is not configured for translation, the message is sent directly to the customer's mailbox, located in phone mail unit 104, as shown in a step 220, and the call flow ends.

If the account is configured for translation, phone mail unit 104 then determines if the message left by the caller is a voice or text message, in a step 224. If the message is a voice message, phone mail unit 104 uses the customer account information from step 212 to determine whether the customer requires voice-to-text translation, in a step 228. If the customer has a voice mailbox, and thus does not require translation of the voice message, then phone mail unit 104 sends the message directly to the customer's mailbox for storage and later retrieval, as shown in a step 232.

If the message is a text message, phone mail unit 104 uses the customer account information from step 212 to determine whether the customer requires text-to-voice translation, in a step 236. If the customer has a text mailbox, and thus does not require translation of the text message, then phone mail unit 104 sends the message directly to the customer's mailbox for storage and later retrieval, as shown in step 232.

In either case, if voice-to-text translation or text-to-voice translation is needed, the call flow continues in a step 240, as shown in FIG. 2B. In step 240, phone mail unit 104 initiates a call to telephone switch 108 and sends the message to telephone switch 108. Phone mail unit 104 concurrently sends a data packet, including the DNIS information to identify the voice or text mailbox as discussed above and the ANI information, to ANI Gateway 120, in a step 244. Telephone switch 108 selects a communications assistant 124 to receive the message for translation, in a step 248. In one embodiment, communications assistant 124 is selected based on availability.

Telephone switch 108 then determines with which control interface 112 the selected communications assistant is associated and sends routing information, relating to the selected communications assistant 124 and corresponding control interface 112, along with the ANI information, to ANI Gateway 120, as shown in a step 252.

ANI Gateway 120 matches the routing information from telephone switch 108 with its corresponding data packet by matching the ANI from telephone switch 108 with the ANI from phone mail unit 104, in a step 256. The data packet is then routed, according to the routing information from telephone switch 108, via ANI Server 116, associated with selected control interface 112, to console 128, associated with selected communications assistant 124, as shown in a step 260.

In a step 264, phone mail unit 104 again determines whether the message received is a voice message or a text message, based on the called number. In the case of a voice mail message for translation into text, phone mail unit 104 plays the recorded voice message to communications assistant 124 via headphones 132, immediately after the data packet has been sent to console 128, in a step 268. In one embodiment, phone mail unit 104 plays the voice message at a slower than normal rate, preferably at half the recorded speed, to allow communications assistant 124 ample time to enter a translated text message into console 128. Once the message has been translated, it is routed via control interface 112, ANI Server 116 and ANI Gateway 120 to telephone switch 108 in a step 276. Telephone switch 108 then routes the translated message to the customer's mailbox in phone mail unit 104 for storage and retrieval, in a step 282. Telephone switch 108 again uses ANI information to route the translated message in step 282.

In the case of a text mail message for translation into voice, phone mail system 104 places a call to the telephone switch 108 and at the same time sends a data packet with the voice mailbox number to ANI Gateway 120. The number dialed by phone mail unit 104 to reach telephone switch 108 identifies the call as phone mail text-to-voice translation and console 128 sets up to receive the Baudot text, as shown in a step 272.

After receiving the data packet from ANI server 116, console 128 sets up a call back to phone mail unit 104 using the supplied voice mailbox number. After seeing the greeting from communications assistant 132, phone mail unit 104 transmits the recorded text message for communication assistant 132 to voice for recording, to complete step 272.

Once the message has been translated into voice, it is routed to telephone switch 108, in a step 276. Telephone switch 108 then routes the translated message to the customer's mailbox in phone mail unit 104 for storage and retrieval, in a step 282. At this point, the call flow ends and the text and/or voice mail message has been stored for the customer.

The system of the present invention is designed, in particular, to provide phone mail service to customers who are hearing-impaired. However, the system of the present invention could also be used by a customer having a conventional voice phone. In this case, the customer may want to convert their voice mail messages to text so that they can be routed to an electronic mailbox, a pager, or via the Internet to a particular site or address. This embodiment is shown in FIGS. 3 and 4 and described in further detail below.

Figure 3:
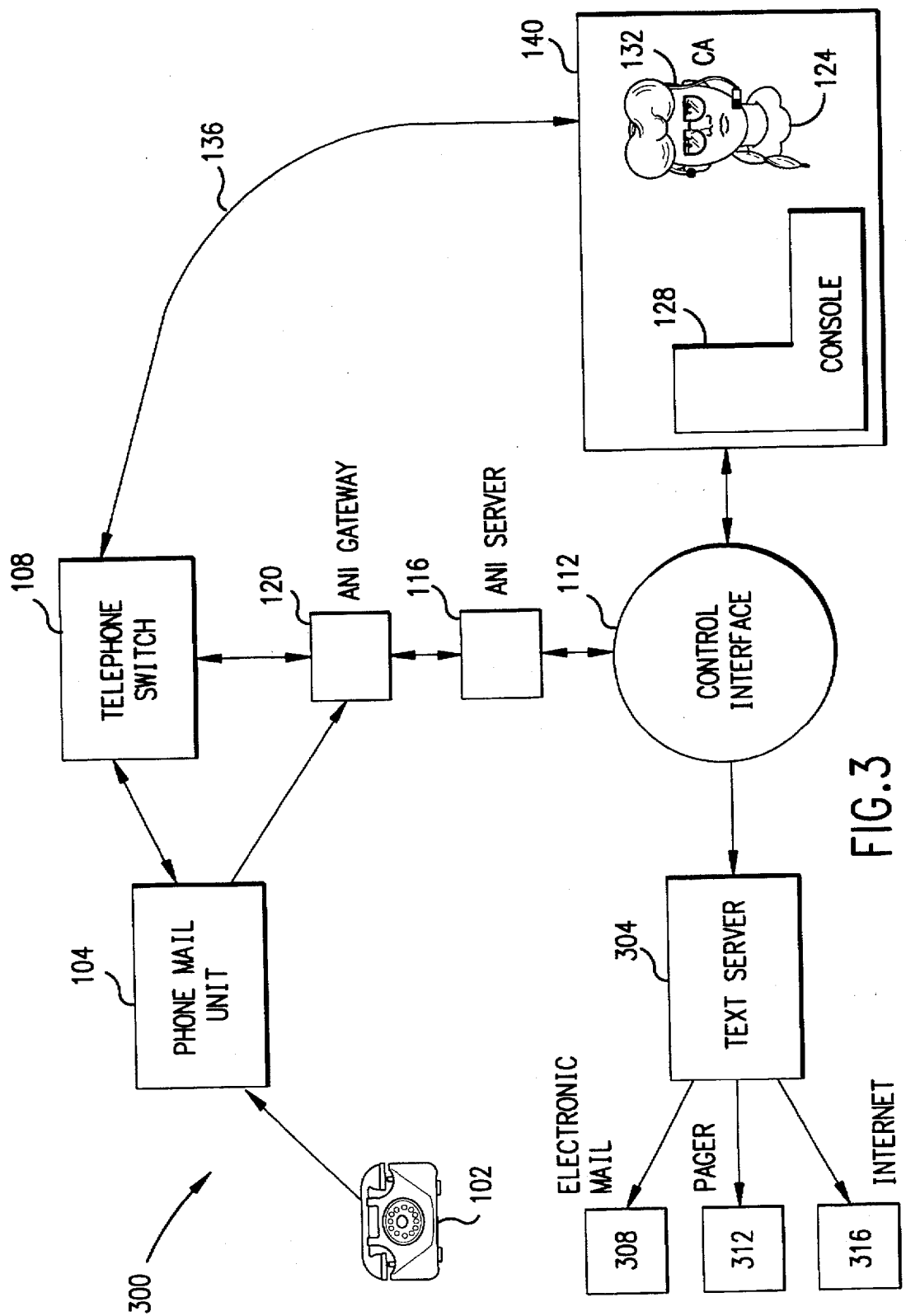
FIG. 3 shows an alternate embodiment of the present invention.

FIG. 3 shows an alternate embodiment of a system 300 of the present invention. System 300 operates in much the same way as system 100 described above. System 300 further includes a text server 304 connected to control interface 112. In this alternate embodiment, a customer can set up his account to receive text messages at several different types of locations. In system 300, text server 304 is connected to one or more of the following: an electronic mailbox 308, a pager 312 and an Internet address 316. Thus, the customer's account information will indicate to communications assistant 124 that the text message should be sent to an alternative mailbox, in place of or in addition to sending the message to the text or voice mailbox that the customer has on phone mail unit 104. After the message is translated, the text message is advanced to one or more of the customer's predetermined destinations.

Figure 4:
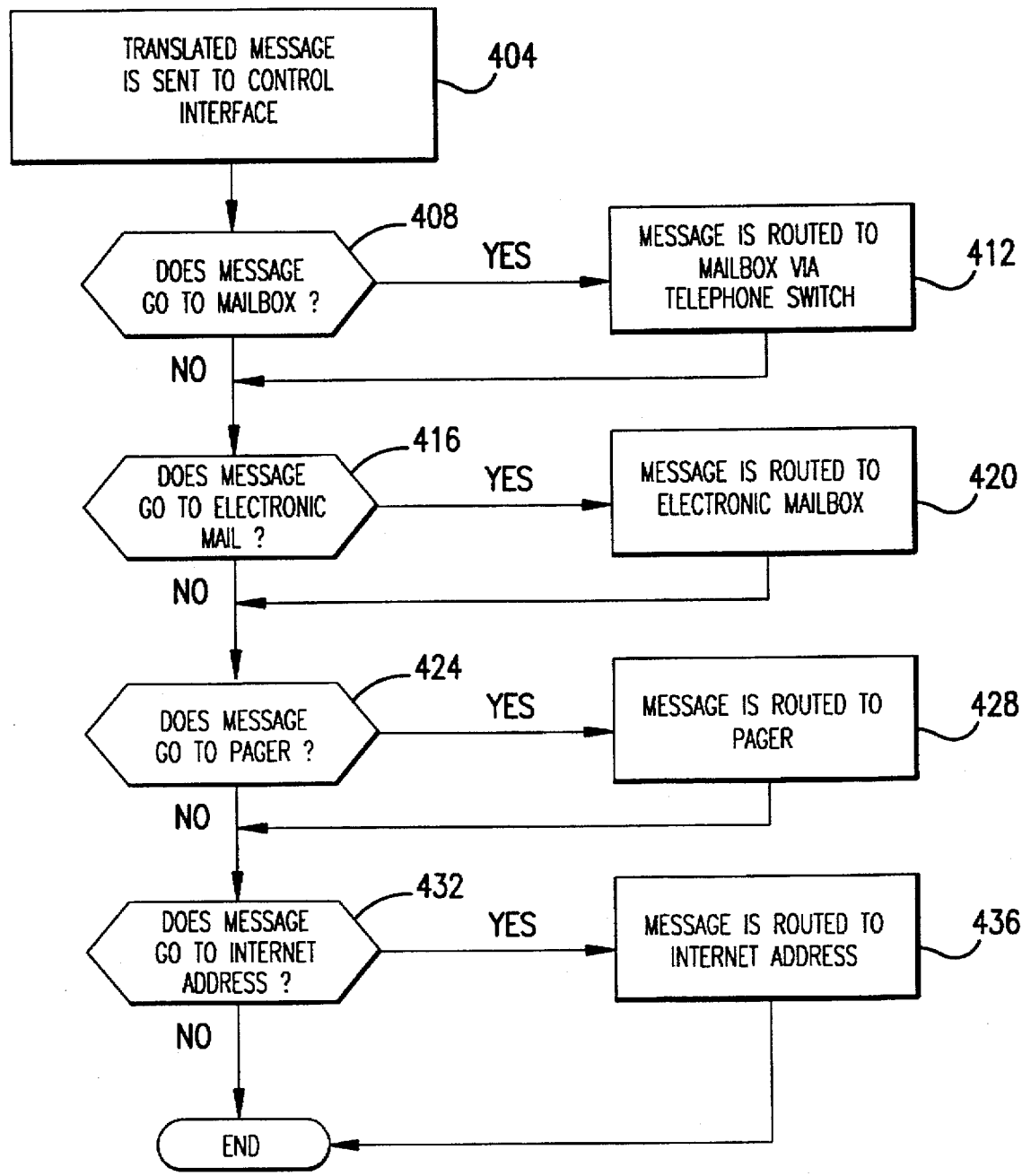
FIG. 4 shows a call flow of the alternative embodiment of the present invention.

FIG. 4 shows a call flow for system 300 of the present invention. The call flow for system 300 is identical to steps 204–272 of FIGS. 2A–2C. Thus, FIG. 4 begins after the message has been translated from voice-to-text in step 268. In a step 404, the translated message is sent to control interface 112. Control interface 112 then determines whether the message should be sent to the customer's mailbox, in a step 408. If yes, control interface 112 sends the translated message to the customer's mailbox in phone mail unit 104, as shown in a step 412, and the call flow continues at a step 416. If no, the call flow moves directly to step 416.

In step 416, control interface 112 determines if the message should be sent to the customer's electronic mailbox 308. If yes, control interface 112 sends the translated message to electronic mailbox 308, as shown in a step 420, and the call flow continues at a step 424. If no, the call flow moves directly to step 424.

In step 424, control interface 112 determines if the message should be sent to the customer's pager 312. If yes, control interface 112 sends the translated message to pager 312, as shown in a step 428, and the call flow continues at a step 432. If no, the call flow moves directly to step 432.

In step 432, control interface 112 determines if the message should be sent to the customer's Internet address 316. If yes, control interface 112 sends the translated message to Internet address 316, as shown in a step 436, and the call flow ends. If no, the call flow ends immediately.

The present invention provides a standard text telephone user with a phone mail service option. This option automatically handles both text and voice callers by providing two separate phone numbers to direct messages to the desired destination.

The present invention can be used to fill open time-spots for communications assistants by providing the operators with messages for translation. Further, the present invention, allows a caller to leave a text pager message without having to speak directly with a communications assistant. Thus, the caller can leave a message immediately, instead of having to wait for a communications assistant to become available.

While the invention has been particularly shown and described with reference to preferred embodiments thereof, it will be understood by those skilled in the art that various changes in form and details may be made therein without departing from the spirit and scope of the invention.

What is claimed is:

1. A system for providing phone mail service for a customer, comprising:

a phone mail unit for receiving a message from a caller, wherein said phone mail unit generates a data packet relating to said message; and a switch connected to said phone mail unit for receiving said message from said phone mail unit and for routing said message to a translation unit, wherein said translation unit receives said message and said data packet and translates said message from voice to text or text to voice, and wherein said message is routed to a pager associated with the customer, after said message has been translated by said translation unit.

2. The system of claim 1, further comprising a control interface disposed between said phone mail unit and said translation unit, for transferring said data packet from said phone mail unit to said translation unit.

3. The system of claim 2, wherein said control interface comprises a Local Area Network.

4. A system for providing phone mail service for a customer, comprising:

a phone mail unit for receiving a message from a caller;

a switch connected to said phone mail unit for receiving said message from said phone mail unit and for routing said message to a translation unit;

a gateway connected to said phone mail unit for receiving a data packet containing call information relating to said message; and a control interface disposed between said gateway and said translation unit, for transferring said data packet from said gateway to said translation unit, wherein said translation unit receives said message and said data packet and translates said message from voice to text or text to voice, and wherein said message is routed back to said phone mail unit for storage in a phone mail box associated with the customer, after said message has been translated by said translation unit.

5. The system of claim 4, whereto said control interface comprises a Local Area Network.

6. A method for providing phone mail service for a customer, comprising the steps of:

receiving, in a phone mail unit, a phone mail message from a caller;

routing said phone mail message from said phone mail unit to a translation unit;

generating a data packet, containing call information relating to said phone mail message, in said phone mail unit;

routing said data packet to said translation unit, wherein said translation unit receives said message and said data packet and translates said message from voice to text or text to voice; and routing said message to a pager associated with the customer, after said message has been translated by said translation unit.

7. The method of claim 6, wherein said data packet is routed to said translation unit via a control interface.

8. The method of claim 7, wherein said control interface comprises a Local Area Network.

9. A system for providing phone mail service for a customer, comprising:

a phone mail unit for receiving a message from a caller;

a switch connected to said phone mail unit for receiving said message from said phone mail unit and for routing said message to a translation unit;

a gateway connected to said phone mail unit for receiving a data packet containing call information relating to said message; and a control interface disposed between said gateway and said translation unit, for transferring said data packet from said gateway to said translation unit, wherein said translation unit receives said message and said data packet and translates said message from voice to text or text to voice, and wherein said message is routed to a pager associated with the customer, after said message has been translated by said translation unit.

10. A system for providing phone mail service for a customer, comprising:

a phone mail unit for receiving a message from a caller;

a switch connected to said phone mail unit for receiving said message from said phone mail unit and for routing said message to a translation unit;

a gateway connected to said phone mail unit for receiving a data packet containing call information relating to said message; and a control interface disposed between said gateway and said translation unit, for transferring said data packet from said gateway to said translation unit, wherein said translation unit receives said message and said data packet and translates said message from voice to text or text to voice, and wherein said message is routed to an electronic mailbox associated with the customer, after said message has been translated by said translation unit.

11. The system of claim 10, wherein said message is routed to said electronic mailbox via the Internet.

12. A system for providing phone mail service for a customer, comprising:

a phone mail unit for receiving a message from a caller, wherein said phone mail unit generates a data packet relating to said message;

a switch connected to said phone mail unit for receiving said message from said phone mail unit and for routing said message to a translation unit; and a gateway connected to said phone mail unit for receiving said data packet containing call information relating to said message and for routing said data packet to said translation unit, wherein said translation unit receives said message and said data packet and translates said message from voice to text or text to voice, and wherein said message is routed to a pager associated with the customer, after said message has been translated by said translation unit.

13. A system for providing phone mail service for a customer, comprising:

a phone mail unit for receiving a message from a caller, wherein said phone mail unit generates a data packet relating to said message;

a switch connected to said phone mail unit for receiving said message from said phone mail unit and for routing said message to a translation unit; and a gateway connected to said phone mail unit for receiving said data packet containing call information relating to said message and for routing said data packet to said translation unit, wherein said translation unit receives said message and said data packet and translates said message from voice to text or text to voice, and wherein said message is routed back to said phone mail unit for storage in a phone mail box associated with the customer, after said message has been translated by said translation unit.

14. A system for providing phone mail service for a customer, comprising:

a phone mail unit for receiving a message from a caller, wherein said phone mail unit generates a data packet relating to said message;

a switch connected to said phone mail unit for receiving said message from said phone mail unit and for routing said message to a translation unit; and a gateway connected to said phone mail unit for receiving said data packet containing call information relating to said message and for muting said data packet to said translation unit, wherein said translation unit receives said message and said data packet and translates said message from voice to text or text to voice, and wherein said message is routed to an electronic mailbox associated with the customer, after said message has been translated by said translation unit.

15. The system of claim 14, wherein said message is routed to said electronic mailbox via the Internet.

* * * * *